Aug. 31, 1965 J. L. GILLIAM 3,203,133
FISHING SINKER
Filed March 17, 1964

INVENTOR.
JOE L. GILLIAM
BY
ATTORNEY 3,203,133
FISHING SINKER
Joe L. Gilliam, Greenville, S.C.
(P.O. Box 10486, West Palm Beach, Fla.)
Filed Mar. 17, 1964, Ser. No. 352,585
2 Claims. (Cl. 43—44.9)

This invention relates to a fishing sinker and more particularly to a sinker which may be easily placed upon and removed from a fishing line or leader without cutting the line.

Fishing sinkers are in common use wherein the sinker is slotted and placed on a line or leader and the slot closed by mashing the lead confining the sinker on the strand. When changing such sinkers it is necessary to cut the line and replace the sinker and then rejoin the line.

Accordingly, it is an important object of this invention to provide a sinker which may be placed upon and removed from a line in a single easy motion without cutting the line.

Another object of the invention is to provide a removable sinker which will avoid catching upon weeds and other obstructions in the fishing waters.

Another important object of the invention is to provide a sinker which may be easily removed from and placed upon a fishing line and reused in this manner indefinitely.

The construction designed to carry out the invention will be hereinafter described, together with other features thereof.

Figure 1:
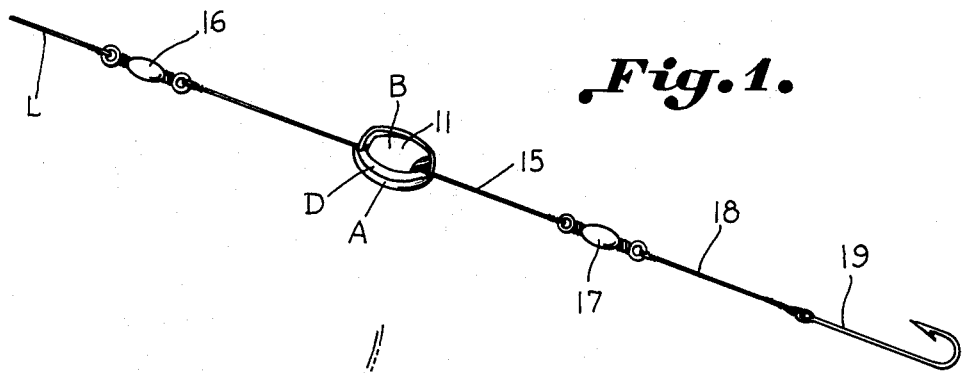
Figure 2:
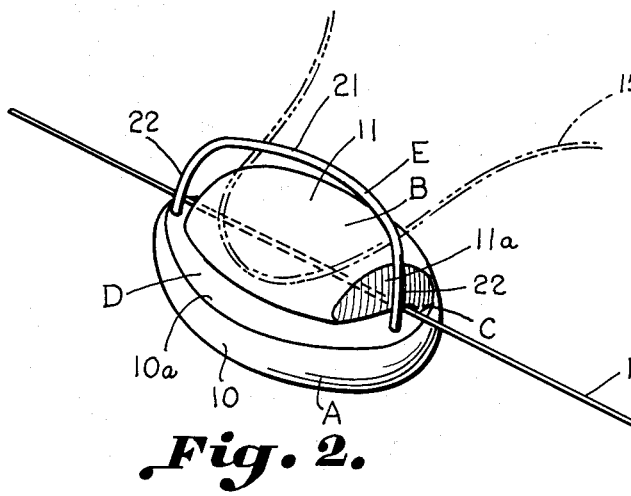
Figure 3:
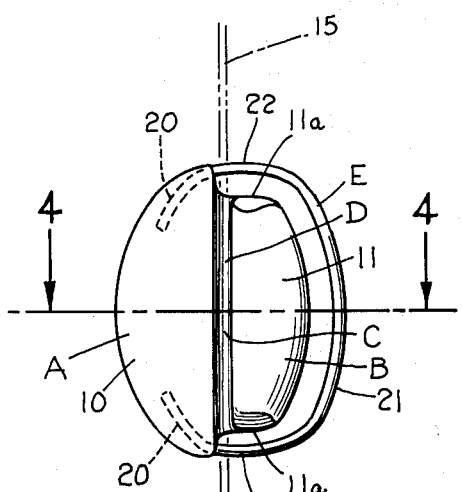
Figure 4:
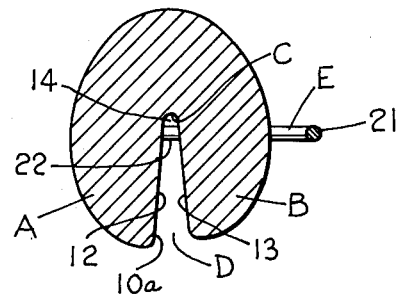

The invention will be more readily understood from a reading of the following specification and by reference to the accompanying drawing forming a part thereof, wherein an example of the invention is shown and wherein:

FIGURE 1 is a perspective view illustrating a sinker constructed in accordance with the present invention operably positioned upon a strand of a fishing rig, FIGURE 2 is an enlarged perspective view of the sinker shown in FIGURE 1 illustrating the mode of attaching the sinker upon a fishing strand, FIGURE 3 is a front elevation of the device illustrated in FIGURE 2, and FIGURE 4 is a transverse sectional plan view taken on the line 4—4 in FIGURE 3.

The drawing illustrates a fishing sinker comprising, a pair of spaced aligned segments A and B having a substantially symmetrical cross-section. The segments A and B are integrally joined by an intermediate portion C on one side thereof to define an open longitudinal slot D extending into the central portion of the sinker body thus formed. The body thus formed is constructed essentially of lead and preferably molded. A wire loop member E is molded within or otherwise fixed upon one of the segments extending transversely across the slot adjacent both ends thereof. The loop member E is spaced from and overlies the other segment adjacent both ends of the slot adjacent the open side thereof. Thus, a fishing strand may be passed under said loop member E into the slot and retained therein during fishing by said member E, permitting sliding movement of the sinker on the strand.

The spaced aligned segments A and B are joined by an intermediate portion C thus forming an elongated substantially elliptically shaped body having a substantially circular cross-section. A body of such a shape offers little resistance when being pulled through the water and avoids entanglement with weeds and other obstructions. The segments A has an arcuate outer surface 10, while the body B has a similar outer surface 11. The surfaces merge with the outer surface of the intermediate portion C forming a continuous arcuate surface.

The segment A has an arcuate lip 10a which extends into a side portion 12 forming the slot D. An opposite side 13 extends inwardly of the body, and terminates with the intermediate portion C to form an open ended passageway 14 extending substantially the entire length of the body. It will be noted that the end portions of the segment B terminate in a flat vertical wall 11a above the lip 10a.

Referring now to FIGURE 1, it will be noted that the sinker is illustrated positioned upon a leader 15 forming a part of a fishing rig. The line L is fastened to a swivel 16 to which one end of the leader 15 is attached. The other end of the leader is attached to a swivel 17. A length of line 18 joins the swivel to a fish hook 19. The strand of the fishing rig to which the sinker is attached may take any desired form and, therefore, could even be a line portion.

A loop member E is partially closed, the end portions 20 being embedded in the segment A. The loop passes laterally across the slot D so as to confine the leader 15 within the passageway 14. The vertical walls 11a permit easy access by the strand to the slot D.

Referring to FIGURE 2, it will be noted that the leader 15 may be looped and passed between the loop member E and the surface 11 of the segment B. The lip 10a will then serve to guide the line into the slot D defined by the inwardly converging walls 12 and 13, and thence to the passageway 14 wherein it is confined by the loop member E. The strand may be easily removed by the reverse of this process.

It will be observed that the line 15 may thus be easily placed in the sinker in one easy motion and similarly removed therefrom. The sinker offers a minimum resistance to the water and the curved surface 21 of the member E prevents the sinker from engaging objects in the water which may tend to foul same. The leader 15 is confined within the passageway 14 by members 22 bridging the ends 20 and the intermediate arcuate portion 21 of the member E.

While a preferred embodiment of the invention has been described using specific terms, such description is for illustrative purposes only, and it is to be understood that changes and variations may be made without departing from the spirit or scope of the following claims.

What is claimed is:

1. A fishing sinker comprising, a body having a pair of aligned spaced substantially symmetrical segments, and an intermediate portion joining said segments integrally on one side thereof to define an open longitudinal slot extending into the central portion of the sinker body thus formed, said body being constructed essentially of lead, and a loop member fixed upon one of the segments adjacent the open side of the slot extending transversely across the slot adjacent both ends thereof, said loop member being spaced from and overlying the other segment adjacent both ends of the slot, whereby a fishing strand may be passed under said loop member into the slot and retained therein during fishing by said loop member permitting sliding movement of the sinker on the strand.

2. A sinker for a fishing rig having a strand comprising, an elongated substantially elliptically shaped body having a substantially symmetrical cross-section, said body being constructed of lead, an open longitudinally disposed slot extending into the central portion of the body, a wire loop member fixed to the body adjacent the open side of the slot, said loop member extending laterally across the slot adjacent each end thereof, said loop member being spaced from and overlying the body on the other side of the slot, and said slot and loop member defining an open ended passageway extending substantially the entire length of the body for the fishing strand, whereby a fishing strand may be passed between the overlying portion of the loop and the body into the slot and be slidably retained within the passageway during fishing.

References Cited by the Examiner

UNITED STATES PATENTS 2,470,995  5/49  Lesser _____ 43—43.12 X
2,548,291  4/51  Dolejs _____ 43—43.1
3,104,488  9/63  Hicks _____ 43—44.91 X

FOREIGN PATENTS 751,511  6/56  Great Britain.

ABRAHAM G. STONE, *Primary Examiner.*